(12) United States Patent
El Fassi et al.

(10) Patent No.: US 7,302,587 B2
(45) Date of Patent: Nov. 27, 2007

(54) SECURE COMPUTER SYSTEM

(75) Inventors: Saïd El Fassi, Draveil (FR); Louis Moreau, Wattignies (FR)

(73) Assignee: Matra Transport International, Montrouge (FR)

( * ) Notice: Subject to any disclaimer, the term of this patent is extended or adjusted under 35 U.S.C. 154(b) by 846 days.

(21) Appl. No.: 09/822,820

(22) Filed: Apr. 2, 2001

(65) Prior Publication Data

US 2003/0023863 A1    Jan. 30, 2003

(51) Int. Cl.
*G06F 21/00*    (2006.01)
*G06F 21/02*    (2006.01)
*G06F 21/24*    (2006.01)

(52) U.S. Cl. ............. 713/192; 713/189; 713/190; 246/182; 303/128; 726/34; 701/29

(58) Field of Classification Search ................ 713/200; 701/29
See application file for complete search history.

(56) References Cited

U.S. PATENT DOCUMENTS

| | | | | |
|---|---|---|---|---|
| 4,400,792 A | * | 8/1983 | Strelow | 714/11 |
| 4,831,521 A | * | 5/1989 | Rutherford | 700/19 |
| 5,048,064 A | * | 9/1991 | Rutherford | 377/20 |
| 5,586,034 A | * | 12/1996 | Takaba et al. | 701/102 |
| 5,794,167 A | * | 8/1998 | Gruere et al. | 701/29 |
| 5,928,362 A | * | 7/1999 | Cardillo et al. | 713/200 |
| 6,009,554 A | * | 12/1999 | Balliet | 714/807 |
| 6,088,802 A | * | 7/2000 | Bialick et al. | 726/3 |
| 6,092,202 A | * | 7/2000 | Veil et al. | 713/201 |
| 6,115,831 A | * | 9/2000 | Hanf et al. | 714/43 |
| 6,138,239 A | * | 10/2000 | Veil | 713/200 |
| 6,199,167 B1 | * | 3/2001 | Heinrich et al. | 713/202 |
| 6,470,284 B1 | * | 10/2002 | Oh et al. | 702/64 |
| 6,862,651 B2 | * | 3/2005 | Beckert et al. | 711/103 |

FOREIGN PATENT DOCUMENTS

| | | |
|---|---|---|
| EP | 0621521 | 10/1994 |
| GB | 2169114 | 7/1986 |

OTHER PUBLICATIONS

"Offline Residue Checking for a Floating-Point Arithmetic Unit Executingoverlapped Operations" IBM Technical Disclosure Bulletin, U.S., IBM Corp. New York, vol. 30, No. 6, Nov. 1, 1987, pp. 391-392, XP000023332—ISSN: 0018-8689—Whole document.
Mahmood A. et al.: "Concurrent Error Detection Using Watchdog Processors—A Survey" IEEE Transactions on Computers, U.S., IEEE Inc. New York, vol. 37, No. 2, Feb. 1, 1988, pp. 160-174, XP000648398—ISSN: 0018-9340—p. 160, left column, line 34—right column, line 22.

* cited by examiner

*Primary Examiner*—Syed A. Zia
(74) *Attorney, Agent, or Firm*—Stites & Harbison PLLC; Ross F. Hunt, Jr.

(57) ABSTRACT

The secure computer system comprises at least one computer having a processor operating under the control of a program on input data that can be associated with a code and delivering output data for output members. A security peripheral that is external but connected to the processor is provided to receive at least the input data codes, the operands, and the nature of the operation of each elementary operation performed by the processor, a code being calculated on each elementary operation performed by the processor in order to verify proper performance of all or part of the executed program. The system is applicable to processes for automatically running rail track systems.

11 Claims, 3 Drawing Sheets

SP = Security peripheral

SECURE COMPUTER SYSTEM

FIELD OF THE INVENTION

The invention relates to secure computer systems designed so as to have a level of security that is quantifiable (i.e., a level of detecting any operating fault that is demonstrable). A particularly important although non-exclusive application of the invention lies in installations for running rail track systems automatically where it is essential to detect any fault that might cause an incident.

DESCRIPTION OF RELATED ART

Various techniques are known for making computer systems secure. In particular, use is made of redundancy which consists in putting in parallel a plurality of members having a probability of failing in common that is very low and below some predefined threshold. Another solution, which can be referred to as "intrinsic" or "fail-safe" security, makes use of components and subassemblies whose behavior in the event of failure is known and is such that any failure gives rise to a secure configuration.

In addition, Matra Transport International has made systems in which security is obtained by introducing redundancy into the digital information for processing such that the probability of a failure passing undetected is below a predetermined threshold.

That solution has been implemented in particular in an encoded processor. Each item of information that might have an influence on security is encoded and a single mode of encoding is adopted over the entire path of the information during its acquisition, its processing, and its transmission. Where necessary, information security can be complemented by encryption.

The main mode of making a system secure by encoding as implemented by Matra Transport International under the trademark DIGISAFE is as follows.

The way in which the principles are implemented can depart from the details described below in order to accommodate the technology used.

Each of the characteristics of each input item of information that has any incidence on security is protected by means of a code. These characteristics can in particular be the following:

a value and an identity (and possibly a time limit on validity); or
 a data item, an address, and possibly an appearance sequence.

Encoding adds redundancy to the information that is to be protected.

When the payload digital information is contained in an n-bit field, the encoding consists in adding k redundancy bits so as to form a word that is encoded on m bits, such that:

$m = n + k$

There are thus $2^n$ possible words belonging to the code and $(2^{n+k} - 2^n)$ possible words that do not belong to the code.

The probability of one word belonging to the code being taken instead of another (i.e. the probability of an error not being detected) is thus:

$p = 1/2^k$

The power of the encoding is selected so as to reach the required security level. Thus, to obtain a probability of $10^{-12}$, it is necessary for k to be greater than 40.

To ensure that the code is compatible with all algorithmic operations, an arithmetic code is selected such that any value x is represented by:

$X = A.x$ where A, the key of the code, is a prime number.

All arithmetic operations thus conserve the property whereby X is a multiple of A. Computation errors can be detected by loss of divisibility by A.

Identity must be protected against an addressing error which runs the risk of causing a variable $Y = A.y$ to be taken instead of $X = A.x$ since both X and Y belong to the code. Arithmetic encoding by multiplication is not sufficient to detect such an error. This difficulty is avoided by associating each variable x with an integer identifier Bx that lies strictly between 0 and A, excluding the ends of the range. x is then represented by:

$X' = A.x + B_x$

Timestamp protection is necessary only if a variable varies as a function of time. If it is desired to guarantee that information is up-to-date on each computation cycle, as characterized by a timestamp, then a timestamp is added to the code of any time-varying information. Thus, x is represented by:

$$X'' = A \cdot x + B_x + D$$
$$\text{value} \quad \text{identity} \quad \text{timestamp}$$

where $B_x + D < A$

The validity of a result is then checked by integer division by A. D is optionally extracted from the remainder $B_x + D$ and the portion $B_x$ is compared with the expected value; since the algorithm is known, the value of the remainder can be predicted as from the design stage.

The code can be more extensive when a higher level of protection is desired.

The above architecture presents some drawbacks and limitations. Since it requires complex manipulations of code, it requires dedicated computing equipment and optimized architecture, i.e. a system that is closed. Nevertheless, it has given very good results in systems that implement processors that are powerful but that also have internal security that is a priori genuine. However, it lends itself poorly to the use of recent microprocessors which include cache memories (or ante-memories) for data or memory since the use thereof requires special security analysis that is complex and does not guarantee absolute security. In addition, there subsist residual scenarios due to the fact of a single microprocessor having present thereon functional information and constants or coding operations. As a consequence, it is not possible to make use of the full power of a microprocessor of that type.

Document GB-A-2 169 114, to which reference can also be made, discloses a computer system having a processor and a coprocessor and processing input data associated with codes; the codes remain associated with the data within the processor, thereby complicating the task it has to perform.

SUMMARY OF THE INVENTION

The invention seeks to depart from the above limitations, and for that purpose to take the load of security digital processing away from the processor by transferring all of the security digital processing to a peripheral. In addition, the resulting security level is thus accurately known.

Consequently, the invention proposes a computer system comprising at least one processor operating under the control of a program, which can be permanent or downloaded, working on input data that can be associated with a code and supplying output data for transmission or application to output members and suitable for being associated with a code, the system being characterized by at least one peripheral external to the processor, connected to the processor to receive at least the input data codes, the operands, and the nature of the operation for each elementary operation performed by the processor, the peripheral having secure architecture and computing a code for each elementary operation performed by the processor and verifying proper operation of all or part of the executed program, while the processor performs computations only on the functional values of the encoded data.

In some cases, the result code is verified on each operation.

The term "operation" is to be understood as meaning an arithmetic, mathematical, logical, or control operation rather than an elementary instruction. This structure puts no constraint on data or program caches in the processor, since the processor performs computations only on the functional values of encoded data, and not on the codes.

At the end of each operation performed in the system, the peripheral receives all of the information necessary for verifying whether the resulting code is correct and it does this by means of arithmetic computations that are simple. In the event of a transfer, it suffices to verify that the code has been conserved. With an operation that makes use of two operands x and y having codes Cx and Cy, an algorithm f stored in the peripheral enables it to determine the correct code Cz for the result. For example, for an addition:

$$Cz=f(CxX+CyY)$$

If k is the number of bits used for representing words in the language and is such that $2^k > A$, then A.x can be written in the following form:

$$A.x=2^k.x-r_k(x)$$

where $r_k(x)$ is the remainder after A has been divided by $2^k.x$, and a value X" can be written as follows:

$$X''=2^k.x+B_x+D-r_k(x)$$

This notation makes it possible to separate the code from the non-coded value:

$$X''=X_k+C_x$$

where:

$X_k=2^k.x$ represents the non-coded value of the variable; and $C_x$ represents the coded portion of the variable.

On the basis of this notation, the processor handles only non-coded data or instructions $X_k$. The peripheral manages the codes and how they vary with the functions applied to coding and known to it.

On each instruction, the processor transfers the identifier (i.e. the "container", where the functional values constitute a "content") of the operands used (e.g. the address of the variable which can also be conserved in a "mirror memory" of the peripheral), the operation performed, and the value of the result.

On the basis of this data, the peripheral computes variations in the code.

In outline, the operations can be written in the following form:

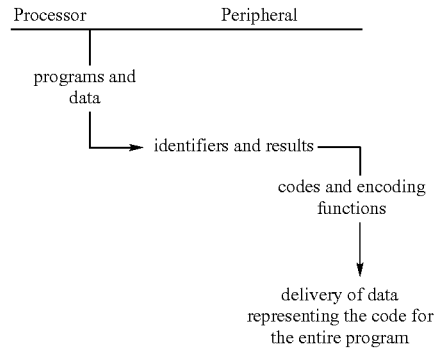

The peripheral can be local or distant. The term "system" for securing the computer itself or the computer system to which it belongs covers not only members for processing information, but also input and output devices for information whose content is to be secured.

The proposed architecture eliminates constraints associated with security when selecting a processor (or processors) and its real time operating system (software). There is no significant loss in the processor's real time computation power and any processing error that is due to any hardware failure or any intrusion in the processing will be detected.

BRIEF DESCRIPTION OF THE DRAWINGS

The above characteristics and others will appear more clearly on reading the following description of particular embodiments, given as non-limiting examples. The description refers to the accompanying drawings, in which.

DESCRIPTION OF THE PREFERRED EMBODIMENTS

Figure 1:
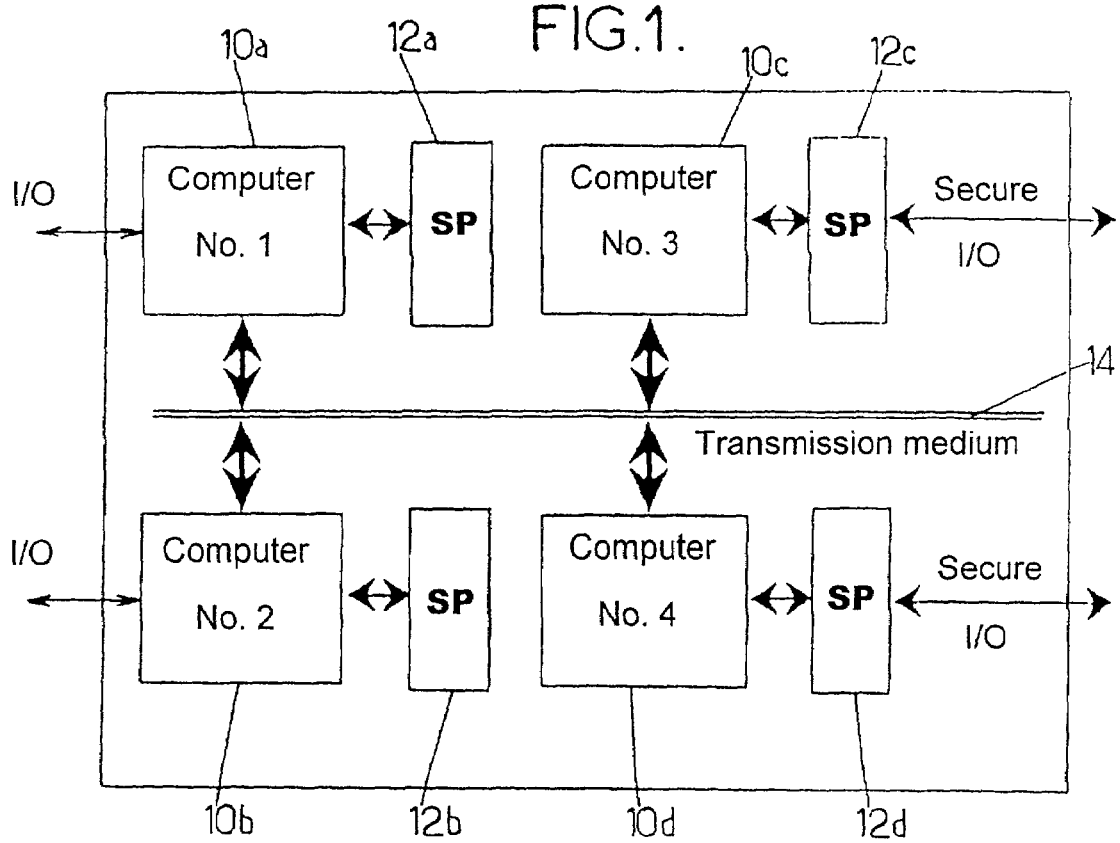
FIGS. 1, 2, and 3 are block diagrams showing how the invention can be adapted to various systems.

The system shown in FIG. 1 comprises a plurality of host computers 10a, 10b, 10c, and 10d interconnected by a transmission medium 14, each host computer having its own security peripheral 12a, 12b, 12c, and 12d. Only the peripherals of computers 10c and 10d are equipped to perform secure input/output (I/O). It can be seen that the system is completely open.

Figure 2:
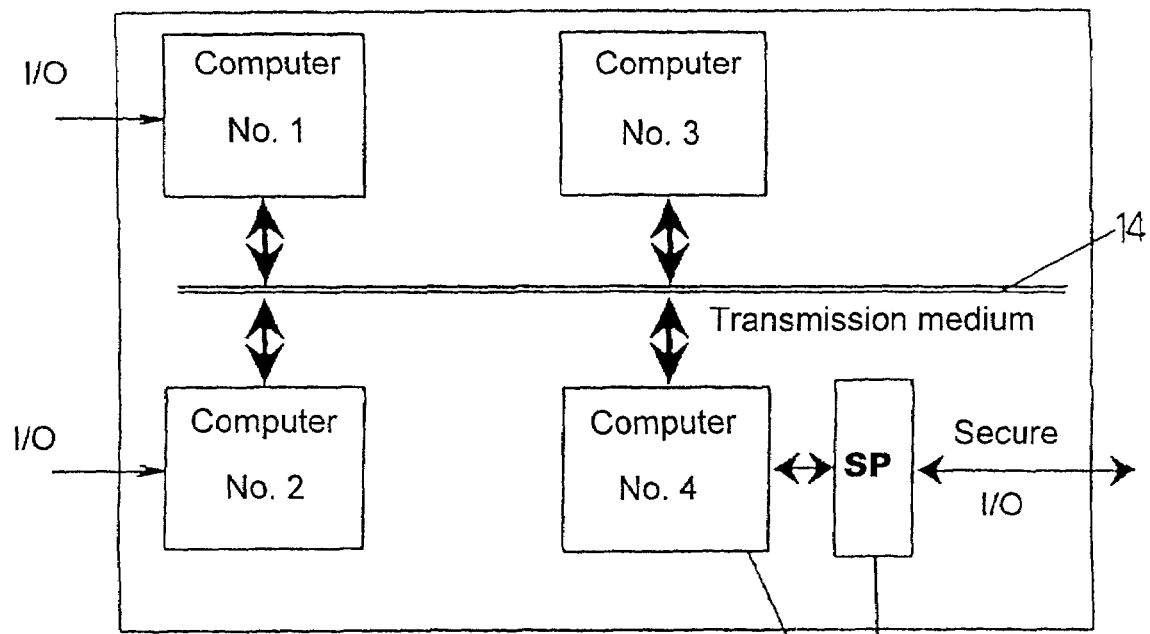

In the embodiment of FIG. 2, a single peripheral 12 installed on the computer 10d which constitutes the host computer provides security for an entire system having four computers (and not only the host computer). This peripheral can provide security either solely for the digital processing performed in the computers, or else it can also provide security for the input/output (I/O) of the host computer. It can also be connected directly to the transmission medium.

The host computer is fitted with a security driver which enables it to dialog with the peripheral and the other computers shown, themselves being fitted with a security peripheral, and capable of being connected by any transmission medium (computer bus, serial links, radio, Internet, etc.).

Figure 3:
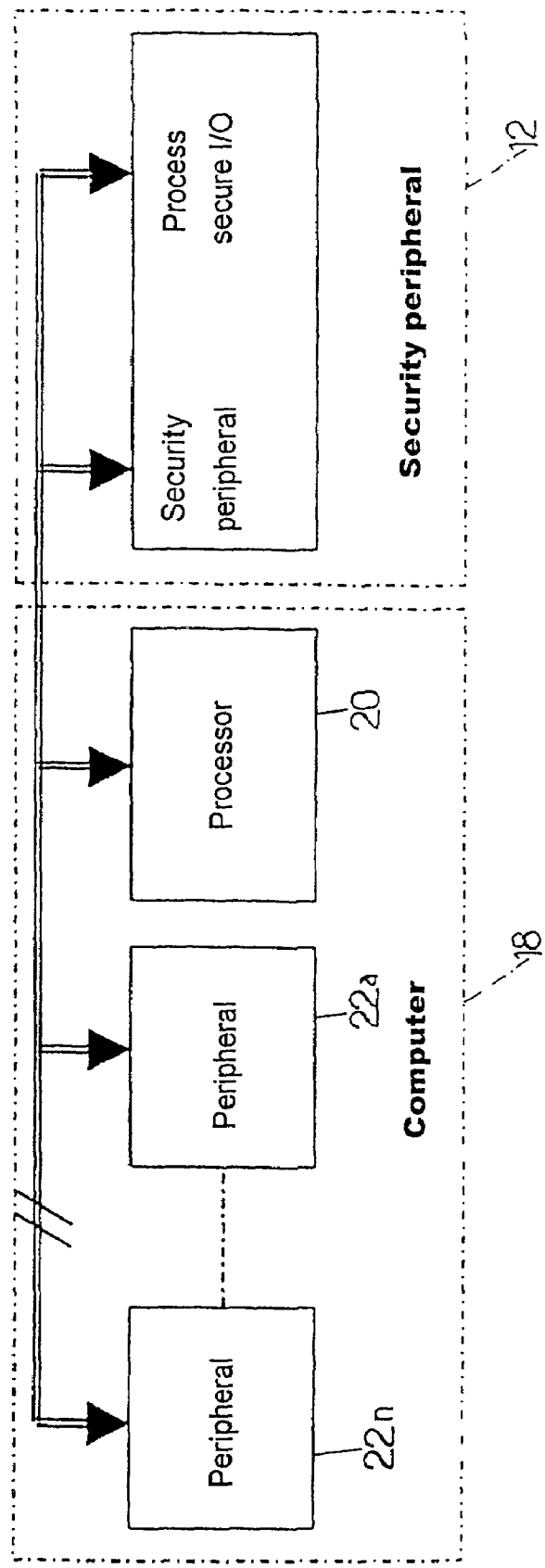

In the system of FIG. 3, the security peripheral 12 is connected to a conventional computer unit 18 constituted by a central unit or processor 20 and conventional peripherals 22a, . . . , 22n. It has one or two computation members with intrinsic security (i.e. which can be assessed a priori) which perform simultaneously:

the security digital processing; and the secure processing of input/output.

In the event of an external or internal misfunction being detected by the peripheral 12, security output validation messages are no longer issued, and the system to which the apparatus belongs is put into a special state which is safe and depends on the application.

In a variant, in the event of an external or internal misfunction being detected by the apparatus, the peripheral 12 causes only the system to be put into a special state that is safe, depending on the application.

It is advantageous for the security peripheral to be constituted by an application-specific integrated circuit (ASIC) that processes security operations and verifies them. By including a dynamic verifying device in the functions of the security peripheral (allowing secure outputs to be activated only in the presence of a code that is compliant), the secure outputs become inhibited as soon as an anomaly appears in the security code.

A security peripheral can also be used in a form which is generally very simple in order to make exchanges between a smart card and one or more computers reliable.

The security peripheral can be implanted in the card itself (as made possible by an ASIC) or it can be associated with the computers or with one of the computers involved, in order to guarantee that the computations and processing performed by the chip in the card and/or by the computers with which it is in communication are free from any error due to unwanted hardware failure of any member of the system involved or due to deliberate or software intrusion.

There follows a brief description of an application of the invention to equipment for automatically running public transport vehicles on a rail track. At least some of the equipment must be made secure. Security requirements can be summarized as follows:

Communication

In the payload portion of secure information in a serial message, any error that occurs between the output of one secure application and the input of another secure application must cause the information to be marked "off code", i.e. there is a mismatch between the payload portion and the redundant portion of the information.

Input Acquisition and Issuing "on/off" outputs

On/off defines inputs and outputs that are characterized by a 0 state or a 1 state. Such a secure input restraining an operation must give rise to an encoded input variable being generated to show the restrictive state or the off-code state. An output variable encoded in the restricted state or the off-code state must lead to a restricted state of the corresponding "on/off" output.

Securing Processing

Any error in executing an elementary operation leading to an error in the payload portion must give rise to an "off-code" state for the output variables concerned by this elementary operation.

Update Check

Each of the above "security" requirements relates to behavior that is purely algorithmic, but the behavior is not instantaneous: in a transport system, response time must be limited in secure manner. For this purpose, the computer can be driven by a secure clock which clocks input acquisition, coded computation, and output control. For these three elements, security is based on time. Serial messages (which cannot be time-stamped) make use of a "logical" time at system level, given that the computers are mutually asynchronous. Taking this into account forms part of the way in which messages are decompacted; to ensure that information is indeed recent, the following measures can be taken:

any drift beyond the threshold of the clock driving the computer should cause the system to be put into a secure configuration;

any inter-computer message that is judged to be too old given its logic time is ignored, with this check being performed by the security peripheral.

All of these operations can be performed by the security peripheral 12 in the system shown in FIG. 2, which is a block diagram of the portion on board a vehicle in equipment that is run automatically.

Figure 4:
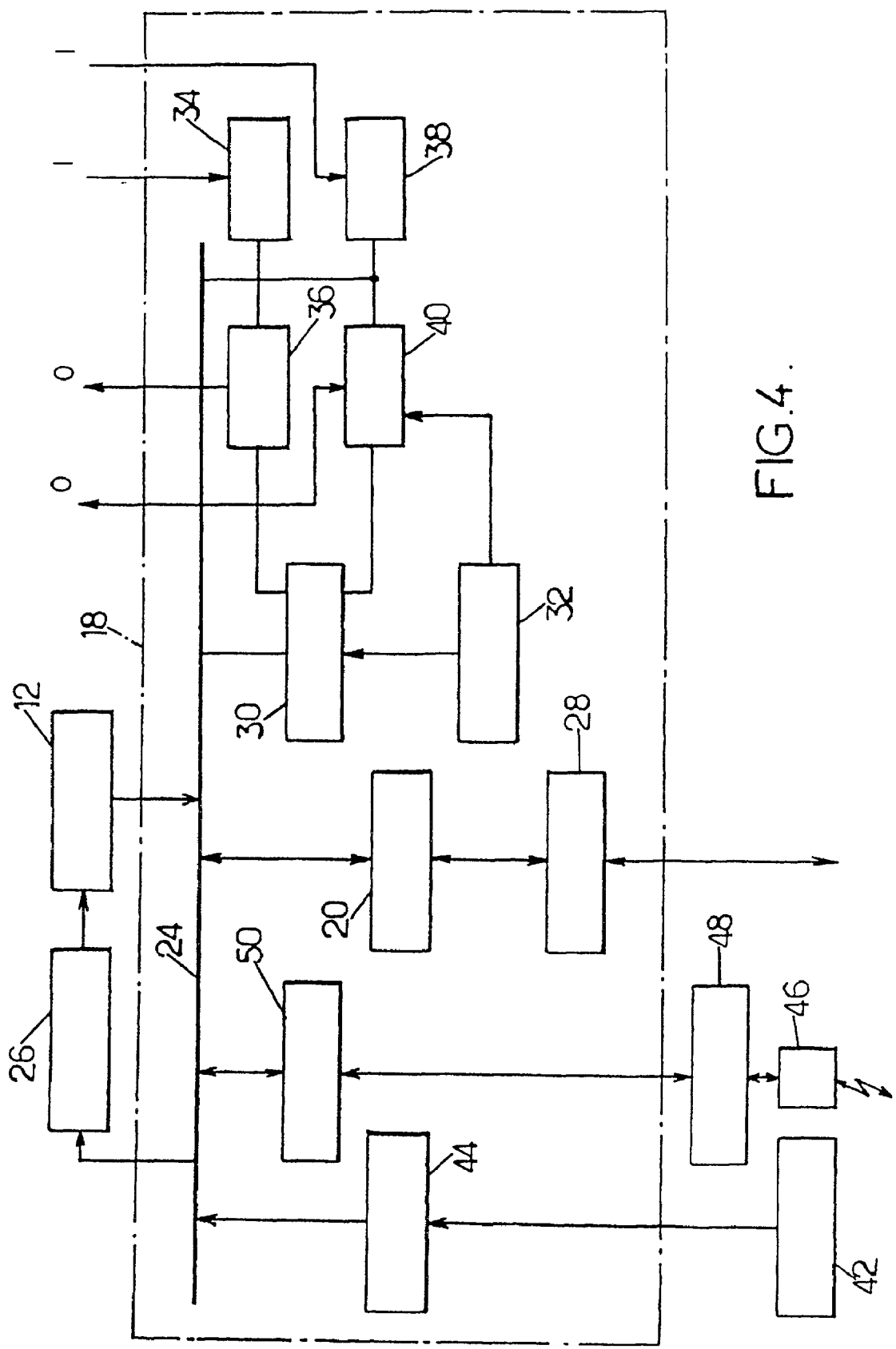
FIG. 4 is a diagram showing one possible structure for the security peripheral.

The system shown in FIG. 4 comprises a computer 18 incorporating a fast microprocessor 20 that has a cache memory and that uses a standard personal computer PCI bus 24. The security peripheral 12 which is generally an ASIC enables full use to be made of the capacities of a fast microprocessor.

A buffer register 26 is provided so that the security peripheral 12 can execute elementary operations in accordance with its capabilities in order to take full advantage of the capacities of the microprocessor.

In order to avoid the register 26 permanently playing back a full cycle or part of a cycle that it has stored, means (not shown) can be provided to put the system in a secure state if this event is detectable, e.g. by checking timestamps.

The microprocessor 20 constitutes the central unit which provides all of the functions of the system. It is provided with a serial interface 28 enabling the system to be connected to other computers.

The system also has a dynamic controller constituted by a digital portion 30 connected to the bus 24 and an analog portion 32. The portion 34 is interfaced with the central unit 20 and with the analog portion 32 which performs various functions:

it supplies the power necessary for feeding secure outputs from sequences generated by the digital portion 30;

it can switch off the power safely in the event of incorrect sequences being delivered by the portion 30;

it can check the frequency of input sequences, i.e. the extent to which information is up to date.

The inputs I and the outputs S of the systems are connected to the analog portion 30. These inputs and outputs include some that are purely functional and not made secure. FIG. 4 shows interfaces 34 and 36 with functional inputs and outputs chained to a first input of the digital portion 30 which is generally constituted by a card that is distinct from another card constituting the analog portion 32. The interfaces 38 and 40 with the secure inputs and outputs are likewise grouped together in chains, optionally having a link to the bus 24 to transfer information making it possible to verify the validity of the codes introduced via these interfaces.

The system also has links with members which supply information used by the digital portion of the dynamic controller.

The members shown include a displacement sensor 42 which is connected via a matching interface 44 connected to the PCI bus 24. The interface generates feed signals for the sensor and transfers the information it receives from the sensor. These members also comprise a communications subassembly with beacons distributed along the track. The subassembly has an antenna 46 for communication with the beacons, an analog module 48 for powering them remotely (if the beacons are passive) and for reception and demodulation, and a control and time-stamping interface 50.

Instead of being designed to perform elementary operations in succession, the security peripheral can be adapted to operating in pipe-line mode, with a time multiplexing structure. It can also have parallel structures enabling a plurality of elementary operations to be performed simultaneously.

The invention claimed is:

1. A computer system for managing the operation of at least one public transport vehicle so as to ensure safe operation thereof, the computer system comprising at least one computer with a processor operating under the control of a program, operating on input data items each suitable for being associated with a code so as to provide input data codes and supplying output data items each suitable for being associated with a code and for being transmitted or applied to output members, the computer system further comprising at least one peripheral external to the processor, connected to the processor to receive at least the input data codes, the operands, and the nature of the operation for each elementary operation performed by the processor, the peripheral having secure architecture and the processor and the at least one peripheral both processing all types of said input data codes including any secure input data codes, the peripheral computing a code for each elementary operation performed by the processor and verifying proper operation of all or part of the executed program controlling the processor by detecting any internal errors produced in the operation of the processor, said verifying being at least partly based on said input data codes and the code computed by the peripheral for each elementary operation performed by the processor, while the processor performs computations only on the functional values of the encoded data, said computer system controlling the safe operation of the at least one public transport vehicle, based on said detecting of internal errors, as well as detecting external errors, and at least one of (i) said processor and (ii) said at least one peripheral being located on the public transport vehicle or along a wayside for the public transport vehicle.

2. A computer system according to claim 1, in which the said program is permanent or downloaded.

3. A computer system according to claim 1, in which the peripheral is single and associated with a host computer to provide security for all of a system having a plurality of computers connected to a common communications medium.

4. A computer system according to claim 3, in which the host computer is fitted with a safety driver which enables it to dialog with the peripheral and with the other computers.

5. A computer system according to claim 1, having a plurality of host computers, interconnected by a transmission medium and each provided with a security peripheral.

6. A computer system according to claim 1, in which the security peripheral or the security peripherals perform security operations only on the inputs/outputs of only some of the processors.

7. A computer system according to claim 1, having a single security peripheral, connected to a computation assembly constituted by a central unit or a processor and peripherals, said security peripheral having computation means that perform:

digital security processing; and security processing of the inputs/outputs.

8. A system according to claim 1, characterized in that said security peripheral is designed to make secure an assembly of the system constituted by a smart card, a reader, and one or more computers involved in the processing, and constituting the system, and to generate the interchanges between the smart card and the computer(s).

9. A system according to claim 1, in which the security peripheral is an ASIC.

10. A system according to claim 1 in which the computer system automatically controls operation of public transport vehicles.

11. A system according to claim 1 wherein the at least one peripheral controls whether the processor itself is processing information input thereto in a secure way independently of whether the input information processed by the processor is secure information.

* * * * *